(12) United States Patent
Takagi et al.

(10) Patent No.: US 11,427,696 B2
(45) Date of Patent: Aug. 30, 2022

(54) CURABLE COMPOSITION AND CURED PRODUCT

(71) Applicant: AGC Inc., Chiyoda-ku (JP)

(72) Inventors: Keisuke Takagi, Chiyoda-ku (JP);
Tomoaki Sakurada, Chiyoda-ku (JP);
Hidenobu Murofushi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 144 days.

(21) Appl. No.: 16/776,611

(22) Filed: Jan. 30, 2020

(65) Prior Publication Data

US 2020/0165411 A1 May 28, 2020

Related U.S. Application Data

(63) Continuation of application No. PCT/JP2018/032145, filed on Aug. 30, 2018.

(30) Foreign Application Priority Data

Oct. 5, 2017 (JP) .............................. JP2017-195229

(51) Int. Cl.
*C08K 3/36* (2006.01)
*C08K 5/101* (2006.01)
*C08K 5/372* (2006.01)

(52) U.S. Cl.
CPC ............... *C08K 3/36* (2013.01); *C08K 5/101* (2013.01); *C08K 5/372* (2013.01); *C08K 2201/011* (2013.01)

(58) Field of Classification Search
CPC .......... C08K 3/36; C08K 5/101; C08K 5/372; C08K 2201/011
USPC ........................................................ 524/740
See application file for complete search history.

(56) References Cited

U.S. PATENT DOCUMENTS

2017/0203476 A1* 7/2017 Obata ..................... B29C 45/02

FOREIGN PATENT DOCUMENTS

| JP | 2006193650 A | * | 7/2006 |
| JP | 2007016065 A | * | 1/2007 |
| JP | 2013-018827 A | | 1/2013 |
| JP | 6132776 B2 | | 5/2017 |

OTHER PUBLICATIONS

International Search Report dated Nov. 20, 2018 in PCT/JP2018/032145 filed Aug. 30, 2018, 2 pages.

* cited by examiner

*Primary Examiner* — Kelechi C Egwim
(74) *Attorney, Agent, or Firm* — Oblon, McClelland, Maier & Neustadt, L.L.P.

(57) ABSTRACT

To provide a curable composition capable of obtaining a cured product which has a high Abbe number, is excellent in transparency and crack resistance, and is capable of suppressing a decrease in transparency over a long period of time; and such a cured product. This curable composition comprises solid silica fine particles A, of which an organic component is at most 5 mass % and the median diameter is from 5 to 20 nm, (meth)acrylate B which has an alicyclic condensed ring, and of which the glass transition temperature of the homopolymer is from 90 to 350° C., epoxy(meth)acrylate C which has no aromatic ring, and in which the amount of substance of ethylenically unsaturated groups is from 0.1 to 3.0 mmol/g (but excluding the (meth)acrylate B), urethane(meth)acrylate D having no aromatic ring (but excluding the (meth)acrylate B and the epoxy(meth)acrylate C), an antioxidant, and a polymerization initiator, wherein said antioxidant comprises an antioxidant having a phenol moiety and an antioxidant having a sulfide moiety (but excluding the antioxidant having a phenol moiety), in the total of the solid silica fine particles A, the (meth)acrylate B, the epoxy(meth)acrylate C and the urethane(meth)acrylate D, the solid silica fine particles A are from 3 to 55 mass %, the (meth)acrylate B is from 3 to 70 mass %, the epoxy (meth)acrylate C is from 10 to 80 mass %, and the urethane (meth)acrylate D is from 0 to 60 mass %, and to 100 parts by mass in total of the solid silica fine particles A, the (meth)acrylate B, the epoxy(meth)acrylate C and the urethane(meth)acrylate D, the antioxidant is from 0.1 to 10 parts by mass, and the polymerization initiator is from 0.1 to 10 parts by mass.

20 Claims, No Drawings

CURABLE COMPOSITION AND CURED PRODUCT

CROSS-REFERENCE TO RELATED APPLICATIONS

The present application is the national stage of international application PCT/JP2018/032145, filed on Aug. 30, 2018, and claims the benefit of the filing date of Japanese Appl. No. 2017-195229, filed on Oct. 5, 2017.

TECHNICAL FIELD

The present invention relates to a curable composition capable of obtaining a cured product which has a high Abbe number, is excellent in transparency and crack resistance, and is capable of suppressing a decrease in transparency over a long period of time, and such a cured product.

BACKGROUND ART

A cured product formed by curing a curable composition has such merits that (i) by an imprinting method, a cast molding method or the like, from a curable composition, cured products of various shapes can be formed in a short time, (ii) it is less likely to break as compared to glass, and (iii) it is light in weight as compared to glass, and thus has attracted attention as a material for an optical member in place of glass.

For an optical member, high transparency is required. Therefore, as a curable composition, one capable of obtaining a cured product with high transparency is required.

Further, for an optical member, particularly for a lens, it is sometimes required to reduce the chromatic aberration. Therefore, as a curable composition, one capable of obtaining a cured product having a high Abbe number may sometimes be required.

As a curable composition capable of obtaining a cured product with a high transparency, the following one has been proposed.

A curable composition comprising silica fine particles surface-modified with a silane compound having an ethylenically unsaturated group, a (meth)acrylate having no ring structure, a (meth)acrylate having an alicyclic structure, and a polymerization initiator (Patent Document 1).

PRIOR ART DOCUMENT

Patent Document

Patent Document 1: Japanese Patent No. 6132776

DISCLOSURE OF INVENTION

Technical Problems

However, the curable composition described in Patent Document 1 has the following problems.

When the cured product is placed under high temperature and high humidity, an organic component at the surface of the silica fine particles surface-modified with a silane compound is hydrolyzed and liberated from the surface of the silica fine particles. The organic component liberated from the surface of the silica fine particles is oxidized and undergoes yellowing under high temperature and high humidity, thus causing coloration of the cured product. When the cured product is colored, the transmittance decreases, whereby the transparency will be lowered.

Since many ethylenically unsaturated groups are present at the surface of the silica fine particles, shrinkage tends to be locally large at the periphery of the silica fine particles at the time of curing the curable composition. Therefore, cracks are likely to occur in the cured product, at the time of curing the curable composition, at the time of firing after curing, at the time of placing the cured product under high temperature and high humidity, or the like. If cracks occur in the cured product, its use for an optical member becomes difficult.

The present invention provides a curable composition capable of obtaining a cured product which has a high Abbe number, is excellent in transparency and crack resistance, and is capable of suppressing a decrease in transparency over a long period of time, and a cured product which has a high Abbe number, is excellent in transparency and crack resistance and is capable of suppressing a decrease in the transparency over a long period of time.

Solution to Problems

The present invention has the following embodiments.

<1> A curable composition comprising
solid silica fine particles A, of which an organic component is at most 5 mass % and the median diameter is from 5 to 20 nm,
(meth)acrylate B which has an alicyclic condensed ring, and of which the glass transition temperature of the homopolymer is from 90 to 350° C.,
epoxy(meth)acrylate C which has no aromatic ring, and in which the amount of substance of ethylenically unsaturated groups is from 0.1 to 3.0 mmol/g (but excluding the (meth)acrylate B),
urethane(meth)acrylate D having no aromatic ring (but excluding the (meth)acrylate B and the epoxy (meth)acrylate C),
an antioxidant, and
a polymerization initiator, wherein
said antioxidant comprises an antioxidant having a phenol moiety and an antioxidant having a sulfide moiety (but excluding the antioxidant having a phenol moiety),
in the total of the solid silica fine particles A, the (meth)acrylate B, the epoxy(meth)acrylate C and the urethane (meth)acrylate D, the solid silica fine particles A are from 3 to 55 mass %, the (meth)acrylate B is from 3 to 70 mass %, the epoxy(meth)acrylate C is from 10 to 80 mass %, and the urethane (meth)acrylate D is from 0 to 60 mass %, and
to 100 parts by mass in total of the solid silica fine particles A, the (meth)acrylate B, the epoxy(meth)acrylate C and the urethane(meth)acrylate D, the antioxidant is from 0.1 to 10 parts by mass, and the polymerization initiator is from 0.1 to 10 parts by mass.
<2> The curable composition according to <1>, wherein
the urethane(meth)acrylate D is 0 mass %,
in the total of the solid silica fine particles A, the (meth) acrylate B and the epoxy(meth)acrylate C, the solid silica fine particles A are from 15 to 50 mass %, the (meth)acrylate B is from 25 to 65 mass %, and the epoxy(meth)acrylate C is from 20 to 50 mass %, and
to 100 parts by mass in total of the solid silica fine particles A, the (meth)acrylate B and the epoxy (meth) acrylate C, the antioxidant is from 0.1 to 10 parts by mass, and the polymerization initiator is from 0.1 to 10 parts by mass.
<3> The curable composition according to <1> or <2>, wherein the alicyclic condensed ring in the (meth)acrylate B is a ring derived from at least one group selected from the group consisting of a norbornyl group, an isobornyl group, a tricyclodecanyl group, a dicyclopentanyl group, a tetracyclododecanyl group, a noradamantyl group, an adamantyl group and an amantyl group.

<4> The curable composition according to any one of <1> to <3>, wherein the number of ethylenically unsaturated groups, which the (meth)acrylate B has, is one or two.

<5> The curable composition according to any one of <1> to <4>, wherein the amount of substance of ethylenically unsaturated groups in the urethane (meth)acrylate D is from 0.1 to 3.0 mmol/g.

<6> The curable composition according to any one of <1> to <5>, which contains a solvent which is capable of dissolving the (meth)acrylate B, the epoxy(meth)acrylate C, the urethane(meth)acrylate D, the antioxidant and the polymerization initiator.

<7> A cured product formed by curing the curable composition as defined in any one of <1> to <6>.

<8> A cured product comprising a matrix resin having an alicyclic condensed ring, and a solid silica fine particles, of which the median diameter is from 5 to 20 nm, and which are dispersed in the matrix resin, wherein
the internal transmittance of light having a wavelength of 400 nm per 1 mm in thickness of the cured product, is at least 90%, and the internal transmittance of light having a wavelength of 400 nm per 1 mm in thickness of the cured product after being held in an atmosphere at a temperature of 85° C. under a relative humidity of 85% for 1,000 hours, is at least 90%.

<9> The cured product according to <8>, wherein to the internal transmittance of light having a wavelength of 400 nm per 1 mm in thickness of the cured product before being held in an atmosphere at a temperature of 85° C. under a relative humidity of 85% for 1,000 hours, the retention rate of the internal transmittance of light having a wavelength of 400 nm per 1 mm in thickness of the cured product after being held in an atmosphere at a temperature of 85° C. under a relative humidity of 85% for 1,000 hours, is at least 90%.

<10> The cured product according to <8> or <9>, wherein the shortest wavelength in the wavelength region where the transmittance of the cured product becomes at least 85% after being held in an atmosphere at a temperature of 85° C. under a relative humidity of 85% for 1,000 hours, is at most 420 nm.

<11> The cured product according to any one of <8> to <10>, wherein the alicyclic condensed ring is a ring derived from at least one group selected from the group consisting of a norbornyl group, an isobornyl group, a tricyclodecanyl group, a dicyclopentanyl group, a tetracyclododecanyl group, a noradamantyl group, an adamantyl group and an amantyl group.

<12> The cured product according to any one of <8> to <11>, wherein in the total of the matrix resin and the solid silica fine particles, the solid silica fine particles are from 15 to 50 mass %, and the matrix resin is from 50 to 85 mass %.

<13> The cured product according to any one of <8> to <12>, wherein the glass transition temperature of the cured product is from 90 to 350° C.

<14> The cured product according to any one of <8> to <13>, wherein the refractive index to light having a wavelength of 589 nm of the cured product is at least 1.45.

<15> The cured product according to any one of <8> to <14>, wherein the Abbe number of the cured product obtained by the following formula I is at least 54, $$v_D=(n_D-1)/(n_F-n_C)$$ Formula I wherein $v_D$ is the Abbe number, $n_D$ is the refractive index to light having a wavelength of 589 nm, $n_F$ is the refractive index to light having a wavelength of 486 nm, and $n_C$ is the refractive index to light having a wavelength of 656 nm.

Advantageous Effects of Invention

According to the curable composition of the present invention, it is possible to obtain a cured product which has a high Abbe number, is excellent in transparency and crack resistance, and is capable of suppressing a decrease in transparency over a long period of time.

The cured product of the present invention has a high Abbe number, is excellent in transparency and crack resistance, and is capable of suppressing a decrease in transparency over a long period of time.

DESCRIPTION OF EMBODIMENTS

<Meanings of Terms>

A "(meth)acryloyl group" is a general term for an acryloyl group and a methacryloyl group.

A "(meth)acrylate" is a general term for an acrylate and a methacrylate.

A "(meth)acrylic acid" is a general term for acrylic acid and methacrylic acid.

"Light" is a general term for ultraviolet light, visible light, infrared light, electron beam and radiation.

The organic component in the solid silica fine particles is the thermogravimetric reduction amount at the time when the solid silica fine particles are heated at a rate of 25° C./min from 10° C. to 500° C. under a nitrogen atmosphere, by using a thermogravimetric measuring apparatus.

The median diameter of the solid silica fine particles in the curable composition is a value obtained by using a particle size distribution measuring apparatus by a dynamic light scattering method.

The median diameter of the solid silica fine particles in the cured product is a value obtained by observing a thin specimen by a transmission electron microscope, measuring diameters with respect to a sufficient number (for example at least 100, preferably at least 200) of solid silica fine particles which can be confirmed by the thin specimen, and averaging them.

The glass transition temperature of a homopolymer of a (meth)acrylate is a midpoint glass transition temperature measured by a differential scanning calorimetry (DSC) method in accordance with JIS K 7121-1987 (corresponding International Standard ISO 3146) with respect to a homopolymer for evaluation obtained by the method as described in Examples. A glass transition temperature of a homopolymer being from 90 to 350° C. shall include, in addition to one, of which the glass transition temperature is observed at 350° C. or less, one, of which the glass transition temperature is not observed at 350° C. or less by a DSC method.

The transmittance of light having a wavelength of 400 nm of a cured product is a value measured at 25° C. by using light having a wavelength of 400 nm by the method described in JIS K 7361:1997 (ISO 13468-1:1996), with respect to a cured product for evaluation obtained by the method as described in Examples.

The expression "to" showing a numerical range is meant to include the numerical values given before and after the expression as the lower limit value and the upper limit value.

<Curable Composition>

The curable composition of the present invention comprises specific solid silica fine particles A, a specific (meth)

acrylate B, a specific epoxy(meth)acrylate C, a specific antioxidant, and a polymerization initiator, as essential components.

The curable composition of the present invention may contain other (meth)acrylates, additives, a solvent, etc.

(Solid Silica Fine Particles A)

The solid silica fine particles A are a component to increase the Abbe number of the cured product. The shape of the fine particles may be spherical, may be linear, or may be other shapes. Among them, from such a viewpoint that the solid silica fine particles A tend to be hardly aggregated, and a decrease in transparency of the cured product tends to be suppressed, the shape is preferably spherical.

The solid silica fine particles A are non-surface-modified, or even if surface-modified, the organic component is at most 5 mass %.

The surface modification of the solid silica fine particles A is meant to cover with an organic silicon compound, an organic phosphorus compound, an organic sulfur compound, etc. by means of the surface treatment, or to let an organic substance be deposited on the surface by means of an intermolecular force such as an electrostatic interaction, hydrogen bonds, etc., not by means of the surface treatment.

The organic component in the solid silica fine particles A is at most 5 mass %, more preferably at most 3 mass %, further preferably at most 1 mass %. When the organic component is at most the upper limit value in the above range, yellowing due to oxidation of the organic component under high temperature and high humidity, will be suppressed, and a decrease in transparency of the cured product will be suppressed. The organic component in the solid silica fine particles A should better be as small as possible, and the lower limit value for the organic component is 0 mass %.

The median diameter of the solid silica fine particles A is from 5 to 20 nm, preferably from 6 to 15 nm, more preferably from 7 to 10 nm. When the median diameter is at least the above lower limit value, handling efficiency will be good. Further, since the particles are less likely to be aggregated, transparency of the cured product will be high. When the median diameter is at most the above upper limit value, scattering of light due to the solid silica fine particles A will be less, and transparency of the cured product will be high.

As commercial products of the solid silica fine particles A, ORGANOSILICASOLS manufactured by Nissan Chemical Industries, Ltd. (MEK-ST-40, TOL-ST, IPA-ST, MEK-ST-UP, EG-ST, NPC-ST-30, etc.) may be mentioned. As the solid silica fine particles A, one type may be used alone, or two or more types may be used in combination.

((Meth)acrylate B)

The (meth)acrylate B has an alicyclic condensed ring.

An alicyclic condensed ring is one in which a plurality of alicyclic rings are condensed. The alicyclic condensed ring has a high bonding force between carbon atoms and is less likely to undergo oxidation or bond cleavage under high temperature and high humidity, whereby the cured product is less likely to be colored, and the transparency is less likely to be lowered.

The alicyclic condensed ring is, from the viewpoint of ready availability of the (meth)acrylate B, preferably a ring derived from at least one group selected from the group consisting of a norbornyl group, an isobornyl group, a tricyclodecanyl group, a dicyclopentanyl group, a tetracyclododecanyl group, a noradamantyl group, an adamantly group and an amantyl group. Among them, an isobornyl group or a dicyclopentanyl group is preferred.

The number of ethylenically unsaturated groups which the (meth)acrylate B has, is preferably one or two, particularly preferably one, from the viewpoint of ready availability and the magnitude of the proportion of the alicyclic condensed ring occupying in the molecule.

The glass transition temperature of a homopolymer of the (meth)acrylate B is from 90 to 350° C., preferably from 150 to 350° C., more preferably from 200 to 350° C., further preferably from 250 to 350° C. When the glass transition temperature is at least the lower limit value, the cured product is less likely to be softened under high temperature and high humidity, and the cured product will be excellent in various properties. When the glass transition temperature is at most the upper limit value, the (meth)acrylate B is readily available.

The (meth)acrylate B may be dicyclopentanyl acrylate, dicyclopentanyl methacrylate, isobornyl acrylate, isobornyl methacrylate, 1-adamantyl methacrylate, 2-adamantyl acrylate, tricyclodecane dimethanol diacrylate, etc. As the (meth) acrylate B, one type may be used alone, or two or more types may be used in combination.

(Epoxy(meth)acrylate C)

The epoxy(meth)acrylate C is one obtained by adding (meth)acrylic acid to an epoxy compound (but excluding the (meth)acrylate B). The epoxy(meth)acrylate C has a hydroxy group formed by the ring opening of an epoxy group, whereby the compatibility with the solid silica fine particles A having silanol groups on the surface will be good. Further, the compatibility is good also with the (meth) acrylate B. Therefore, in a curable composition containing the epoxy(meth)acrylate C, the solid silica fine particles A, the (meth)acrylate B and the epoxy(meth)acrylate C are compatible, and as a result, the transparency of the cured product will be high.

The epoxy(meth)acrylate C has no aromatic ring. Since the epoxy(meth)acrylate C does not have an aromatic ring to reduce the Abbe number, reduction of the Abbe number of the cured product can be suppressed.

In the epoxy(meth)acrylate C, the amount of substance of ethylenically unsaturated groups is from 0.1 to 3.0 mmol/g, preferably from 0.3 to 2.7 mmol/g, more preferably from 0.5 to 2.5 mmol/g. When the amount of substance is at least the lower limit value in the above range, it can be sufficiently cured. When the amount of substance is at most the upper limit value in the above range, the cured product is less likely to shrink at the time of curing the curable composition, and cracks are less likely to be formed in the cured product. Therefore, the cured product can be preferably used as an optical member.

Commercial products of the epoxy (meth)acrylate C may be NK Oligo (EA-5311, EA-5511, etc.) manufactured by Shin Nakamura Chemical Co., Ltd., Denacol acrylates (DA-722, DA-314, etc.) manufactured by Nagase ChemteX Corporation, and epoxy acrylates (Miramer PE230, etc.) manufactured by MIWON.

As the epoxy(meth)acrylate C, one type may be used alone, or two or more types may be used in combination.

(Urethane(meth)acrylate D)

The urethane(meth)acrylate D is a compound which has a urethane bond and has two or more (meth)acryloyl groups (but excluding the (meth)acrylate B and the epoxy(meth) acrylate C). The urethane(meth)acrylate D has a urethane bond showing hydrogen bonding properties, whereby the compatibility with the solid silica fine particles A having silanol groups on the surface is good. Further, it has good compatibility also with the (meth)acrylate B and the epoxy (meth)acrylate C. Therefore, in the curable composition containing the urethane(meth)acrylate D, the solid silica fine particles A, the (meth)acrylate B, the epoxy(meth)acrylate C and the urethane(meth)acrylate D are compatible, and as a result, the transparency of the cured product will be high. Further, it has a urethane bond showing hydrogen bonding properties, and it is possible to improve the flexibility of the cured product, whereby crack resistance will be high. Especially when the thickness of the cured product is at least 5 mm or the volume of the cured product is at least 1 cm$^3$, the above effect becomes remarkable. From the viewpoint of simplicity in preparation of a cured product for evaluation, the thickness is preferably at most 50 mm, and the volume is preferably at most 50 cm$^3$.

The urethane(meth)acrylate D has no aromatic ring. Since the urethane(meth)acrylate D does not have an aromatic ring to reduce the Abbe number, reduction of the Abbe number of the cured product can be suppressed.

The amount of substance of ethylenically unsaturated groups in the urethane(meth)acrylate D is from 0.1 to 3.0 mmol/g, preferably from 0.3 to 2.7 mmol/g, more preferably from 0.5 to 2.5 mmol/g. When the amount of substance is at least the lower limit value in the above range, it can be sufficiently cured. When the amount of substance is at most the upper limit value in the above range, the cured product is less likely to shrink at the time of curing the curable composition, and cracks are less likely to be formed in the cured product. Therefore, the cured product can be suitably used as an optical member.

Commercial products of the urethane (meth)acrylate D may be NK Oligo (UA-160TM, U-412A, UA-4200, UA-4400, UA-122P, etc.) manufactured by Shin Nakamura Chemical Co., Ltd., EBECRYL (8402, 8807, 9260, etc.) manufactured by DAICEL-ALLNEX LTD., KRM (8667, 8904, etc.) manufactured by DAICEL-ALLNEX LTD., UA-306H, UA-306T, UA-3061, UA-510H manufactured by Kyoeisha Chemical Co., Ltd., UX-3204, UX-4101, UX-8101 manufactured by Nippon Kayaku Co., Ltd., etc. As the urethane(meth)acrylate D, one type may be used alone, or two or more types may be used in combination.

(Antioxidant)

The antioxidant includes an antioxidant having a phenol moiety and an antioxidant having a sulfide moiety (but excluding the above antioxidant having a phenol moiety).

The antioxidant having a phenol moiety captures radicals which are formed in a cured product and which cause coloration, thereby to suppress a decrease in transparency of the cured product. The antioxidant having a sulfide moiety can regenerate the antioxidant having a phenol moiety which has captured radicals. Thus, by using the antioxidant having a phenol moiety and the antioxidant having a sulfide moiety in combination, it is possible to suppress a decrease in transparency of the cured product over a long period of time.

Commercial products of the antioxidant having a phenol moiety may be IRGANOX (tradename) (259, 1010, 1035, 1076, 1098, 1135, etc.) manufactured by BASF Japan Ltd., and ADK STAB (tradename) (AO-50, AO-60, etc.) manufactured by ADEKA Corporation. As the antioxidant having a phenol moiety, one type may be used alone, or two or more types may be used in combination.

Commercial products of the antioxidant having a sulfide moiety may be sulfur-based antioxidant T0205 manufactured by Tokyo Chemical Industry Co., Ltd., and ADK STAB (tradename) (AO-412S, AO-503, etc.) manufactured by ADEKA Corporation. As the antioxidant having a sulfide moiety, one type may be used alone, or two or more types may be used in combination.

The antioxidant may contain an antioxidant other than the antioxidant having a phenol moiety and the antioxidant having a sulfide moiety.

The total proportion of the antioxidant having a phenol moiety and the antioxidant having a sulfide moiety in the antioxidant is preferably at least 50 mass %, particularly preferably 100 mass %.

In the total of the antioxidant having a phenol moiety and the antioxidant having a sulfide moiety, the proportion of the antioxidant having a phenol moiety is preferably from 5 to 95 mass %, more preferably from 10 to 90 mass %, further preferably from 15 to 85 mass %.

(Polymerization Initiator)

The polymerization initiator is suitably selected depending on e.g. the curing method (photocuring or thermosetting).

As the polymerization initiator, a photopolymerization initiator or a thermal polymerization initiator may be mentioned. As the polymerization initiator, from the viewpoint of efficiency for preparation of a cured product, a photopolymerization initiator is preferred.

As the photopolymerization initiator, there are a photoradical polymerization initiator, a cationic photopolymerization initiator and an anionic photopolymerization initiator. Among them, a photoradical polymerization initiator which generates radicals by absorbing light is preferred in view of easiness of production of a cured product.

The photoradical polymerization initiator may be an alkyl phenone type, an acylphosphine oxide type, a titanocene type, an oxime ester type, an oxyphenylacetic acid ester type, a benzoin type, a benzophenone type, a thioxanthone type, benzyl-(o-ethoxycarbonyl)-α-monooxime, glyoxy ester, 3-ketocoumarin, 2-ethyl anthraquinone, camphorquinone, tetramethylthiuram sulfide, azobisisobutyronitrile, benzoyl peroxide, a dialkyl peroxide, tert-butyl peroxypivalate or the like. From the viewpoint of sensitivity and compatibility, an alkyl phenone type, an acylphosphine oxide type, a benzoin type or a benzophenone type is preferred.

As the photopolymerization initiator, one type may be used alone, or two or more types may be used in combination.

The thermal polymerization initiator may be 2,2'-azobisisobutyronitrile, benzoyl peroxide, tert-butyl hydroperoxide, cumene hydroperoxide, di-tert-butyl peroxide, dicumyl peroxide or the like. From the viewpoint of the decomposition temperature, 2,2'-azobisisobutyronitrile or benzoyl peroxide is preferred.

As the thermal polymerization initiator, one type may be used alone, or two or more types may be used in combination.

(Additives)

The curable composition of the present invention may contain additives such as a surfactant, a thixotropic agent, an antifoaming agent, a light stabilizer, an anti-gelling agent, a photosensitizer, a resin, a resin oligomer, a carbon compound, metallic fine particles, metal oxide particles (but excluding solid silica fine particles A), a silane coupling agent, other organic compounds, etc.

(Solvent)

The curable composition of the present invention may contain a solvent. However, prior to curing the curable composition, it is preferred to remove the solvent.

As the solvent, any may be used so long as it is a solvent capable of dissolving the (meth)acrylate B, the epoxy(meth)acrylate C, the antioxidant and the polymerization initiator. Among them, preferred is a solvent having at least one of an ester structure, a ketone structure, a hydroxy group, an aromatic hydrocarbon group and an ether structure. Preferred examples of the solvent include 1-methoxy-2-propanol, propylene glycol monomethyl ether acetate, methyl ethyl ketone, methyl isobutyl ketone, 2-propanol, toluene, etc. Among them, methyl ethyl ketone, 2-propanol or toluene is particularly preferred.

Further, in the case of using a solvent in the present invention, the content of the solvent in the curable composition may be suitably adjusted depending on the desired viscosity, coating properties, desired thickness, etc.

((Content) Proportion of Each Component)

The proportion of the solid silica fine particles A is from 3 to 55 mass %, preferably from 5 to 51 mass %, more preferably from 15 to 50 mass %, further preferably from 17 to 46 mass %, particularly preferably from 19 to 42 mass %, in the total of the solid silica fine particles A, the (meth)acrylate B, the epoxy (meth)acrylate C and the urethane (meth)acrylate D. When the proportion of the solid silica fine particles A is at least the lower limit value in the above range, the Abbe number of the cured product will be high. When the proportion of the solid silica fine particles A is at most the upper limit value in the above range, the compatibility with other components will be good, the solid silica fine particles A tend to be uniformly dispersed in the curable composition, and transparency of the cured product will be excellent. Further, the cured product is less likely to become brittle, and cracks are less likely to be formed in the cured product.

The proportion of the (meth)acrylate B is from 3 to 70 mass %, preferably from 5 to 66 mass %, more preferably from 25 to 65 mass %, further preferably from 27 to 61 mass %, particularly preferably from 29 to 57 mass %, in the total of the solid silica fine particles A, the (meth)acrylate B, the epoxy(meth)acrylate C and the urethane(meth)acrylate D. When the proportion of the (meth)acrylate B is at least the lower limit value in the above range, curability of the curable composition will be good. When the proportion of the (meth)acrylate B is at most the upper limit value in the above range, the Abbe number of the cured product will be high.

The proportion of the epoxy (meth)acrylate C is from 10 to 80 mass %, preferably from 12 to 76 mass %, more preferably from 20 to 50 mass %, further preferably from 22 to 46 mass %, particularly preferably from 24 to 42 mass %, in the total of the solid silica fine particles A, the (meth)acrylate B, the epoxy(meth)acrylate C and the urethane (meth)acrylate D. When the proportion of the epoxy(meth)acrylate C is at least the lower limit value in the above range, compatibility with other components will be good, and transparency of the cured product will be excellent. When the proportion of the epoxy (meth)acrylate C is at most the upper limit value in the above range, the Abbe number of the cured product will be high.

The urethane(meth)acrylate D is one which may be incorporated as the case desires, in the curable composition of the present invention, and its proportion is from 0 to 60 mass %, preferably from 1 to 56 mass %, more preferably from 3 to 52 mass %, in the total of the solid silica fine particles A, the (meth)acrylate B, the epoxy(meth)acrylate C and the urethane(meth)acrylate D. When the proportion is at least the lower limit value in the above range, it is possible to improve the flexibility of the cured product, whereby crack resistance will be high. When the proportion is at most the upper limit value in the above range, the Abbe number of the cured product will be high.

The amount of the antioxidant is from 0.1 to 10 parts by mass, preferably from 0.5 to 8 parts by mass, more preferably from 1 to 6 parts by mass, to 100 parts by mass in total of the solid silica fine particles A, the (meth)acrylate B, the epoxy(meth)acrylate C and the urethane(meth)acrylate D. When the addition amount of the antioxidant is at least the lower limit value in the above range, it is possible to suppress a decrease in transparency of the cured product over a long period of time. When the addition amount of the antioxidant is at most the upper limit value in the above range, it is possible to prevent deterioration of curability of the cured product.

The amount of the polymerization initiator is from 0.1 to 10 parts by mass, preferably from 0.2 to 7 parts by mass, more preferably from 0.5 to 5 parts by mass, to 100 parts by mass in total of the solid silica fine particles A, the (meth)acrylate B, the epoxy(meth)acrylate C and the urethane (meth)acrylate D. When the addition amount of the polymerization initiator is at least the lower limit value in the above range, it is possible to easily form a cured product. When the addition amount of the polymerization initiator is at most the upper limit value in the above range, since it can be uniformly mixed, the polymerization initiator remaining in the cured product will be less, whereby deterioration of physical properties of the cured product can be suppressed.

The total amount of other components such as additives is preferably at most 5 parts by mass, more preferably at most 3 parts by mass, to 100 parts by mass in total of the solid silica fine particles A, the (meth)acrylate B, the epoxy(meth)acrylate C and the urethane(meth)acrylate D.

In the case where the curable composition of the present invention does not contain the urethane(meth)acrylate D, i.e. in the case where the amount of the urethane(meth)acrylate D is 0 mass %, it is a matter of course that the calculation of each (content) proportion of the solid silica fine particles A, the (meth)acrylate B, the epoxy(meth)acrylate C, the antioxidant, the polymerization initiator and the additives, is carried out based on the total of the solid silica fine particles A, the (meth)acrylate B and the epoxy(meth)acrylate C, excluding the urethane(meth)acrylate D, i.e. not based on the total of the solid silica fine particles A, the (meth)acrylate B, the epoxy(meth)acrylate C, and the urethane (meth)acrylate D.

The curable composition of the present invention as described above, is capable of obtaining a cured product having a high Abbe number, for the following reasons.

Since it is possible to contain the solid silica fine particles A having a high Abbe number in a specific proportion by suppressing proportions of the (meth)acrylate B and epoxy (meth)acrylate C having low Abbe numbers, the Abbe number of the cured product will be high.

Since the epoxy(meth)acrylate C does not have an aromatic ring to lower the Abbe number, lowering of the Abbe number of the cured product can be suppressed.

Since the urethane(meth)acrylate D does not have an aromatic ring to lower the Abbe number, lowering of the Abbe number of the cured product can be suppressed.

Further, the curable composition of the present invention is capable of obtaining a cured product excellent in transparency, for the following reasons.

Since the solid silica fine particles A is not surface-modified, or even if surface-modified, the organic component is at most 5 mass %, yellowing due to oxidation of the organic component under high temperature and high humidity will be suppressed, whereby deterioration in transparency of the cured product will be suppressed.

Since the median diameter of the solid silica fine particles A is from 5 to 20 nm, transparency of the cured product will be high.

Since the proportion of the solid silica fine particles A is not too large, the solid silica fine particles A tend to be uniformly dispersed in the curable composition, whereby transparency of the cured product will be excellent.

Since the (meth)acrylate B has an alicyclic condensed ring, the cured product is less likely to be colored, whereby the transparency is less likely to be lowered.

Since the epoxy(meth)acrylate C is contained in a specific proportion, the compatibility of the respective components will be good, whereby transparency of the cured product will be excellent.

Since the urethane(meth)acrylate D is contained in a specific proportion, the compatibility of the respective components will be good, whereby transparency of the cured product will be excellent.

Further, the curable composition of the present invention is capable of obtaining a cured product excellent in crack resistance, for the following reasons.

Since the proportion of the solid silica fine particles A is not too large, the cured product is less likely to become brittle, whereby cracks are less likely to be formed in the cured product.

Since no ethylenically unsaturated groups are present at the surface of the solid silica fine particles A, or even if the organic component at the surface of the solid silica fine particles A is all ethylenically unsaturated groups, it is at most 5 mass %, cracks are less likely to be formed in a cured product.

Since the amount of substance of ethylenically unsaturated groups in the epoxy(meth)acrylate C is not too large, cracks are less likely to be formed in the cured product.

Since the urethane(meth)acrylate D has a urethane bond showing hydrogen bonding properties, flexibility will be improved, whereby crack resistance will be improved.

Further, the curable composition of the present invention contains an antioxidant in a specific proportion, in which an antioxidant having a phenol moiety to capture radicals thereby to suppress a decrease in transparency of the cured product, and an antioxidant having a sulfide moiety capable of regenerating the antioxidant having a phenol moiety, which has captured radicals, are used in combination, whereby it is possible to obtain a cured product which is capable of suppressing a decrease in transparency over a long period of time.

Further, the curable composition of the present invention contains the (meth)acrylate B, of which the glass transition temperature is at least 90° C., whereby it is possible to obtain a cured product which is less likely to be softened under high temperature and high humidity, and it is possible to obtain a cured product capable of suppressing a decrease in transmittance at high temperature and high humidity.

Further, in the case where the curable composition of the present invention contains the urethane(meth)acrylate D, it is possible to improve the flexibility of the cured product, whereby it is possible to obtain a cured product, in which cracks will not be formed during the heat treatment at the time of preparing the cured product or after the heat treatment, or after a moisture and heat resistance test.

The curable composition of the present invention can be used in an imprinting method, a cast molding method or the like, and is suitable as a curable composition to be used in an imprinting method.

<Cured Product>

The cured product of the present invention comprises a matrix resin having an alicyclic condensed ring, and solid silica fine particles with a median diameter of from 5 to 20 nm dispersed in the matrix resin.

The matrix resin is one in which components other than the solid silica fine particles A, for example, the (meth)acrylate B, the epoxy(meth)acrylate C, etc. in the curable composition of the present invention, are cured.

The proportion of the solid silica fine particles is preferably from 15 to 50 mass %, more preferably from 17 to 46 mass %, further preferably from 19 to 42 mass %, in the total of the matrix resin and the solid silica fine particles.

The proportion of the matrix resin is preferably from 50 to 85 mass %, more preferably from 54 to 83 mass %, further preferably from 58 to 81 mass %, in the total of the matrix resin and the solid silica fine particles. Further, when the proportion of the solid silica fine particles is at least the lower limit value in the above range, the Abbe number of the cured product will be high. Further, when the proportion of the solid silica fine particles is at most the upper limit value in the above range, transparency of the cured product will be excellent. Further, the cured product is less likely to become brittle, whereby cracks are less likely to be formed in the cured product.

The cured product of the present invention is preferably one obtained by curing the curable composition of the present invention.

The cured product of the present invention may be formed on the surface of a substrate to form a laminate which has a layer made of the cured product of the present invention and a layer made of the substrate. A preferred example of the substrate in this case may be a substrate made of an inorganic material, such as a silicon wafer, glass, quartz glass, a metal or the like, or a substrate made of an organic material, such as a fluororesin, a silicone resin, an acrylic resin, a polycarbonate resin or the like. Such a substrate may be a planar substrate or a curved substrate.

The glass transition temperature of the cured product of the present invention is from 90 to 350° C., preferably from 100 to 350° C., more preferably from 150 to 350° C., further preferably from 200 to 350° C. When the glass transition temperature of the cured product of the present invention is at least the lower limit value, the cured product is less likely to be softened under high temperature and high humidity, and the cured product will be excellent in various properties. When the glass transition temperature of the cured product of the present invention is at most the upper limit value, the curable composition of the present invention will be easily available.

The refractive index to light having a wavelength of 589 nm of the cured product is preferably at least 1.45, more preferably from 1.48 to 1.53. When the refractive index is within the above range, even when combined with another member such as glass, Fresnel reflection is less likely to occur, and loss of the transmittance will be less.

The Abbe number obtained from the following formula I of the cured product is preferably at least 54, more preferably at least 56, further preferably at least 58. When the Abbe number is at least the lower limit value in the above range, the chromatic aberration is less likely to occur. The Abbe number should better be higher, and the upper limit is not particularly limited, but is about 70 in consideration of being an organic substance.

$$v_D = (n_D - 1)/(n_F - n_C) \qquad \text{Formula I}$$

Here, $v_D$ is the Abbe number, $n_D$ is the refractive index to light having a wavelength of 589 nm, $n_F$ is the refractive index to light having a wavelength of 486 nm, and $n_C$ is the refractive index to light having a wavelength of 656 nm.

The transmittance of light having a wavelength of 400 nm per 1 mm in thickness of the cured product is preferably at least 88%, more preferably at least 89%, further preferably at least 90%. When the transmittance of such light is at least the above lower limit value, transparency of the cured product will be further excellent.

The transmittance of light having a wavelength of 400 nm per 1 mm in thickness of the cured product is obtained from the following formula II.

The transmittance of light having a wavelength of 400 nm per 1 mm in thickness of the cured product=

$$T_1 \times (1-r)^2 \qquad \text{Formula II}$$

Here, $r=\{(n-1)/(n+1)\}^2$. $T_1$ is the internal transmittance of light having a wavelength of 400 nm per 1 mm in thickness of the cured product, and is obtained from the following formula III. n is the refractive index to light having a wavelength of 400 nm at 25° C. of the cured product.

$$T_1 = (T_Y/100)^{1/Y} \times 100 \qquad \text{Formula III}$$

Here, $T_Y$ is the internal transmittance of light having a wavelength of 400 nm per Y mm in thickness of the cured product, and is obtained from the following formula IV.

$$T_Y = \text{(Transmittance of light having a wavelength of 400 nm per } Y \text{ mm in thickness of the cured product)}/(1-r)^2 \qquad \text{Formula IV}$$

In the wavelength range of from 360 nm to 830 nm, the shortest wavelength in a wavelength region where the transmittance of the cured product becomes to be at least 85%, is preferably at most 390 nm, more preferably at most 380 nm, further preferably at most 370 nm. When said shortest wavelength is at most the above upper limit value, transparency of the cured product will be further excellent.

After being held in an atmosphere at a temperature of 85° C. under a relative humidity of 85% for 1,000 hours, in the wavelength range of from 360 nm to 830 nm, the shortest wavelength in a wavelength region where the transmittance becomes to be at least 85%, is preferably at most 420 nm, more preferably at most 410 nm, further preferably at most 400 nm, regardless of the thickness of the cured product. When said shortest wavelength is at most the above upper limit value, it is possible to suppress a decrease in transparency of the cured product over a long period of time, and the transparency will also be further excellent.

The internal transmittance of light having a wavelength of 400 nm per 1 mm in thickness of the cured product as calculated from the formula III and the formula IV, is preferably at least 90%, more preferably at least 92%, further preferably at least 94%. When said internal transmittance is at least the lower limit value in the above range, transparency of the cured product will be particularly excellent. Said internal transmittance of the cured product should better be higher, and the upper limit is 100%.

After being held in an atmosphere at a temperature of 85° C. under a relative humidity of 85% for 1,000 hours, the internal transmittance of light having a wavelength of 400 nm per 1 mm in thickness of the cured product is preferably at least 90%, more preferably at least 92%, further preferably at least 94%. When said internal transmittance is at least the lower limit value in the above range, it is possible to suppress a decrease in transparency of the cured product over a long period of time.

To the internal transmittance of light having a wavelength of 400 nm per 1 mm in thickness of the cured product before being held in an atmosphere at a temperature of 85° C. under a relative humidity of 85% for 1,000 hours, the retention rate of the internal transmittance of light having a wavelength of 400 nm per 1 mm in thickness of the cured product after being held in an atmosphere at a temperature of 85° C. under a relative humidity of 85% for 1,000 hours, is preferably at least 90%, more preferably at least 92%, further preferably at least 94%. When the retention rate of such internal transmittance is at least the lower limit value in the above range, it is possible to suppress a decrease in transparency of the cured product over a long period of time.

The internal transmittance of light having a wavelength of 400 nm per 0.1 mm in thickness of the cured product as obtained from the formula V, is preferably at least 99.5%, more preferably at least 99.6%, further preferably at least 99.7%. When said internal transmittance is at least the lower limit value in the above range, transparency of the cured product will be further excellent. The internal transmittance of the cured product should better be higher, and the upper limit is 100%.

$$\text{Internal transmittance per 0.1 mm in thickness of the cured product} = (\text{internal transmittance per } Y \text{ mm in thickness of the cured product}/100)^{0.1/Y} \times 100 \qquad \text{Formula V}$$

The internal transmittance of light having a wavelength of 400 nm per 0.1 mm in thickness of the cured product after being held in an atmosphere at a temperature of 85° C. under a relative humidity of 85% for 1,000 hours, is preferably at least 99.0%, more preferably at least 99.2%, further preferably at least 99.4%. When said internal transmittance is at least the lower limit value in the above range, it is possible to suppress a decrease in transparency of the cured product over a long period of time.

The method for producing a cured product of the present invention may be a method in which a curable composition is cured in such a state that the curable composition is in contact with a mold having a reverse pattern of the fine pattern on its surface, to form a cured product having the fine pattern on its surface (imprinting method); or a method in which a curable composition is injected into a mold cavity, and the curable composition is cured to form a cured product (cast molding method).

The curing method may be photocuring or thermosetting, and may be suitably selected depending on the polymerization initiator.

As the curing method, from the viewpoint of efficiency for the production of a cured product, photocuring is preferred.

The cured product of the present invention as described above, is preferably one which is obtained by curing the curable composition of the present invention and which has the above described respective characteristics, whereby the Abbe number is high, it is excellent in transparency and crack resistance, and it is possible to suppress a decrease in transparency over a long period of time.

EXAMPLES

In the following, the present invention will be described in detail with reference to Examples, but the present invention is not limited thereto.

Ex. 1 to 12 are Examples of the present invention, and Ex. 13 to 19 are Comparative Examples.

(Median Diameter of Solid Silica Fine Particles in Curable Composition)

Obtained by using a particle size distribution measuring apparatus by a dynamic light scattering method (manufactured by Otsuka Electronics Co., Ltd., FPAR1000).

(Organic Component in Solid Silica Fine Particles)

Using a thermogravimetric apparatus (manufactured by TA Instruments Ltd., TGA-Q500), the solid silica fine particles were heated at a rate of 25° C./min from 10° C. to 500° C. under a nitrogen atmosphere, whereby the thermogravimetric reduction of the solid silica fine particles was obtained. The thermogravimetric reduction was adopted as the organic component in the solid silica fine particles A.

(Amount of Substance of Ethylenically Unsaturated Groups)

Using a FT-NMR apparatus (manufactured by JEOL Ltd., JNM-AL300), the $^1$H-NMR spectrum of the epoxy(meth) acrylate or the curable composition was measured (300 MHz, solvent: $CDCl_3$, reference: tetramethylsilane). Using 1,4-bis(trifluorobenzene) as an internal standard, the amount of substance of ethylenically unsaturated groups in the vicinity of 6 ppm was calculated.

(Refractive Index of Curable Composition)

Measured at a temperature of 25° C. at a wavelength of 589 nm by using an Abbe refractometer (manufactured by ATAGO CO., LTD., Multiwavelength Abbe refractometer DR-M2).

(Abbe Number of Curable Composition)

Calculated from the above formula I by measuring the respective refractive indexes at wavelengths of 589 nm, 486 nm and 656 nm, at a temperature of 25° C., by using the Abbe refractometer (as mentioned above).

(Preparation of Cured Product for Evaluation)

A curable composition was applied to the surface of a quartz glass substrate having release-treated. On the other hand, a glass substrate having primer-treated to improve the adhesion to a cured product was prepared. Via a spacer having a thickness of 1 mm, the curable composition was sandwiched between the quartz glass substrate and the glass substrate, and ultraviolet rays were radiated from a high pressure mercury lamp at an exposure amount of 3,000 mJ/cm$^2$ to the curable composition. By peeling off the release-treated quartz glass substrate, about 100 mm$^3$ of a cured product in close contact with the surface of the primer-treated glass substrate, was obtained. The obtained cured product was subjected to heat treatment at 180° C. for 15 minutes, to obtain a cured product for evaluation having a thickness of 1 mm.

(Refractive Index of Cured Product)

Using a refractive index measuring device (manufactured by US Metricon, prism coupler: 2010/M), the refractive indexes to lights with wavelengths of 473 nm, 594 nm and 658 nm of the cured product for evaluation were measured at a temperature of 25° C., and using a Metricon Fit attached to the apparatus, the refractive index to light having a wavelength of 589 nm was calculated.

(Abbe Number of Cured Product)

The Abbe number was calculated from the above formula I by calculating the refractive indexes of the cured product for evaluation at the respective wavelengths by using a Metricon Fit attached to the above-mentioned refractive index measuring device.

(Transmittance of Cured Product)

Using an ultraviolet-visible-near-infrared spectrophotometer (manufactured by Shimadzu Corporation, Solid Spec-3700), the transmittance was measured. The transmittance to light having a wavelength of 400 nm, and the shortest wavelength where the transmittance is at least 85% were obtained.

(Internal Transmittance of Cured Product)

Using the Metricon Fit attached to the above-mentioned refractive index measuring device, the refractive index n to a wavelength of 400 nm of the cured product for evaluation, was calculated. The internal transmittance of light having a wavelength of 400 nm per 1 mm in thickness of the cured product was calculated from the above formula III and formula IV. Further, the internal transmittance of light having a wavelength of 400 nm per 0.1 mm in thickness of the cured product was calculated from the above formula V.

(Crack Resistance of Cured Product)

The cured product for evaluation was visually observed, and the appearance was evaluated by the following standards.

A+: No formation of cracks was observed after heat treatment at 250° C. for 15 minutes at the time of preparing the cured product for evaluation, and after the wet heat test as described below.

A: No formation of cracks was observed after heat treatment at 180° C. for 15 minutes at the time of preparing the cured product for evaluation, and after the wet heat test as described below.

B: Formation of cracks was observed after heat treatment at 180° C. for 15 minutes at the time of preparing the cured product for evaluation.

(Wet Heat Test)

The cured product for evaluation was subjected to a test of being held in an atmosphere at a temperature of 85° C. under a relative humidity of 85% for 1,000 hours (humidity and heat resistance test). With respect to the cured product after the test, the transmittance was measured by using the ultraviolet-visible-near-infrared spectrophotometer (manufactured by Shimadzu Corporation, Solid Spec-3700). The transmittance at a wavelength of 400 nm, and the shortest wavelength in a wavelength region where the transmittance becomes to be at least 85%, were obtained. Further, with respect to the cured product after the test, the internal transmittance of light with a wavelength of 400 nm per 1 mm in thickness of the cured product, and the internal transmittance of light with a wavelength of 400 nm per 0.1 mm in thickness of the cured product, were obtained in the same manner as the above-described method.

(Retention Rate of Internal Transmittance)

Calculated by the following formula VI.

Retention rate of internal transmittance (%)=(internal transmittance of light with a wavelength of 400 nm per 1 mm in thickness of the cured product after the heat resistance test/internal transmittance of light with a wavelength of 400 nm per 1 mm in thickness of the cured product prior to the heat resistance test)×100      Formula VI (Median Diameter of Solid Silica Fine Particles in Cured Product)

Obtained by using a transmission electron microscope (manufactured by JEOL Ltd., JEM-2010F). The cured product was embedded in an epoxy resin (manufactured by BUEHLER, EpoxiCure), then, a thin section with a thickness of 50 nm was cut out at 25° C. by means of an ultramicrotome (manufactured by Leica Microsystems Inc., EMUC6i), and the obtained thin section was sampled on a Cu-made carbon grid. The sampled thin section was subjected to transmission electron microscopy observation at an acceleration voltage of 100 kV. With respect to a sufficient number (for example, 100 or more, preferably 200 or more) of solid silica fine particles, which can be confirmed by this section, electron microscopic images were taken, whereupon these diameters were measured, and their cumulative distribution was obtained and the 50% particle size was adopted as the median diameter.

(Glass Transition Temperature)

A (meth)acrylate or a curable composition was applied to the surface of a release-treated quartz glass substrate. Via a spacer with 100 μm, another release-treated quartz glass substrate was overlaid, to sandwich the (meth)acrylate or the curable composition between two quartz glass substrates, whereupon from a high pressure mercury lamp, ultraviolet rays were irradiated in an exposure amount of 3,000 mJ/cm$^2$ to the (meth)acrylate or the curable composition. By peeling the release-treated quartz glass substrate, a cured product was obtained. The obtained cured product was subjected to a heat treatment at 100° C. for 15 minutes, to obtain a homopolymer of the (meth)acrylate or a cured product of the curable composition having a thickness of 100 μm.

Using a differential scanning calorimeter (manufactured by TA Instruments Inc., DSC-Q20), the homopolymer or the cured product was heated at a rate of 20° C./min from 10° C. to 350° C. in a nitrogen atmosphere, to obtain the glass transition temperature. With respect to one, of which the glass transition temperature was not observed at 350° C., the glass transition temperature was assumed to be at least 350° C.

(Solid Silica Fine Particles)

Solid silica fine particles A-1 dispersion: ORGANOSILICASOL (manufactured by Nissan Chemical Industries, Ltd., MEK-ST-40, dispersion medium: methyl ethyl ketone, $SiO_2$ concentration: 40 mass %, shape of fine particles: sphere, median diameter of fine particles: 10 nm, organic component of fine particles: 3 mass %).

Solid silica fine particles A-2 dispersion: ORGANOSILICASOL (manufactured by Nissan Chemical Industries, Ltd., TOL-ST, dispersion medium: toluene, $SiO_2$ concentration: 40 mass %, shape of fine particles: sphere, median diameter of fine particles: 10 nm, organic component of fine particles: 5 mass %).

Solid silica fine particles A-3 dispersion: ORGANOSILICASOL (manufactured by Nissan Chemical Industries, Ltd., IPA-ST, dispersion medium: 2-propanol, $SiO_2$ concentration: 30 mass %, shape of fine particles: spherical, median diameter of fine particles: 10 nm organic component of fine particles: 3 mass %).

Solid silica fine particles A-4 dispersion: ORGANOSILICASOL (manufactured by Nissan Chemical Industries, Ltd., MEK-ST-UP, dispersion medium: methyl ethyl ketone, $SiO_2$ concentration: 20 mass %, shape of fine particles: linear, median diameter of fine particles: 12 nm, organic component of fine particles: 3 mass %).

Solid silica fine particles A'-1 dispersion: ORGANOSILICASOL (manufactured by Nissan Chemical Industries, Ltd., MEK-AC-2140Z, dispersion of fine particles surface-modified with 3-methacryloyloxypropyltrimethoxysilane, dispersion medium: methyl ethyl ketone, $SiO_2$ concentration: 40 mass %, shape of fine particles: spherical, median diameter of fine particles: 10.3 nm, organic component of fine particles: 9 mass %).

Solid silica fine particles A'-2 dispersion: ORGANOSILICASOL (manufactured by Nissan Chemical Industries, Ltd., MEK-ST-L, dispersion medium: methyl ethyl ketone, $SiO_2$ concentration: 30 mass %, shape of fine particles: sphere, median diameter of fine particles: 40 nm, organic component of fine particles: 4 mass %).

Solid silica fine particles A'-3 dispersion: dispersion of surface-modified silica fine particles prepared in accordance with Comparative Example 3 described in Japanese Patent No. 6132776 (dispersion medium: 2-propanol, $SiO_2$ concentration: 27 mass %, shape of fine particles: spherical, median diameter of fine particles: 11.5 nm, organic component of fine particles: 18 mass %).

((Meth)acrylate)

Acrylate B-1: dicyclopentenyl acrylate (manufactured by Tokyo Chemical Industry Co., Ltd., glass transition temperature of the homopolymer: 120° C.).

Acrylate B-2: isobornyl acrylate (manufactured by Tokyo Chemical Industry Co., Ltd., glass transition temperature of the homopolymer: 90° C.).

Methacrylate B-3: 1-adamantyl methacrylate (manufactured by Osaka Organic Chemical Industry Ltd., ADMA, glass transition temperature of the homopolymer: 250° C.).

Acrylate B'-1: dicyclopentenyl oxyethyl acrylate (manufactured by Hitachi Chemical Co., Ltd., glass transition temperature of the homopolymer: 24° C.).

Acrylate B'-2: cyclohexyl acrylate (manufactured by Tokyo Chemical Industry Co., Ltd., glass transition temperature of the homopolymer: 32° C.).

(Epoxy (meth)acrylate)

Epoxy acrylate C-1: epoxy acrylate (manufactured by Shin Nakamura Chemical Co., Ltd., NK Oligo EA-5311, compound obtained by adding acrylic acid to a reaction product of trimethylolpropane and epichlorohydrin, amount of substance of ethylenically unsaturated groups: 2.8 mmol/g).

Epoxy acrylate C-2: epoxy acrylate (manufactured by Shin Nakamura Chemical Co., Ltd., NK Oligo EA-5511, compound obtained by adding acrylic acid to glycidyl ether, amount of substance of ethylenically unsaturated groups: 1.5 mmol/g).

Epoxy acrylate (C'-1): epoxy acrylate (manufactured by Nagase ChemteX Corporation, DA-722, compound obtained by adding acrylic acid to 1,2-cyclohexanedicarboxylic acid diglycidyl ester, amount of substance of ethylenically unsaturated groups: 3.7 mmol/g).

Epoxy acrylate C'-2: epoxy acrylate (manufactured by Nagase ChemteX Corporation, DA-314, compound obtained by adding acrylic acid to a reaction product of glycerol with epichlorohydrin, amount of substance of ethylenically unsaturated groups: 4.8 mmol/g).

(Urethane (meth)acrylate)

Urethane acrylate D-1: urethane acrylate (manufactured by Shin Nakamura Chemical Co., Ltd., UA-4200, mass average molecular weight: 1,300, amount of substance of ethylenically unsaturated groups: 1.5 mmol/g).

(Antioxidant)

Antioxidant E-1: tetrakis[methylene-3-(3,5-di-tert-butyl-4-hydroxyphenyl) propionate] methane (manufactured by BASF Japan Ltd., IRGANOX (tradename) 1010).

Antioxidant E-2: 2,2'-thio-diethyl-bis(3-(3,5-di-tert-butyl-4-hydroxyphenyl) propionate (manufactured by BASF Japan Ltd., IRGANOX (tradename) 1035).

Antioxidant E-3: 3,3'-thiodipropionic acid didodecyl (manufactured by Tokyo Chemical Industry Co., Ltd.).

(Polymerization initiator)

Polymerization initiator F-1: 2-hydroxy-2-methyl propiophenone (manufactured by BASF Japan Ltd., Irgacure (tradename) 1173).

Polymerization initiator F-2: 2,4,6-trimethylbenzoyl-diphenyl-phosphine oxide (manufactured by BASF Japan Ltd., Irgacure (tradename) TPO).

EXAMPLES 1 TO 19

So that the proportions of solid contents became to be the proportions as shown in Tables 1, 2 and 5, the solid silica fine particles dispersion, the (meth)acrylate and the epoxy (meth)acrylate were mixed so as to be uniform by using, as a solvent, methyl ethyl ketone, toluene or 2-propanol, alone or in a combination of two or more, and then, the solvent was evaporated under reduced pressure at 40° C. Specifically, in Ex.1, 2, 5 and 7 to 14, methyl ethyl ketone was used, in Ex. 4 and 15, methyl ethyl ketone and 2-propanol were used, and in Ex. 3, 6 and 16 to 19, methyl ethyl ketone and toluene were used. So that the added amounts became as shown in Tables 1, 2 and 5, the antioxidant and the polymerization initiator were added to the obtained mixture to obtain a curable composition as shown in Ex. 1 to 19. Evaluation results are shown in Tables 3, 4 and 6.

B-1
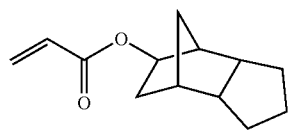

B-2
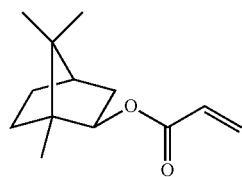

B-3
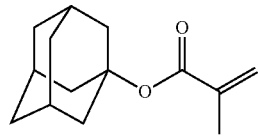

B'-1
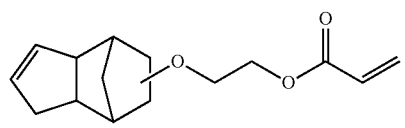

B'-2
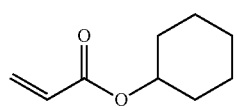

D-1
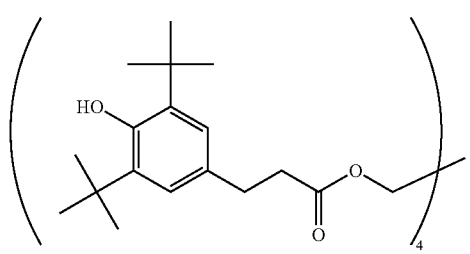

D-2
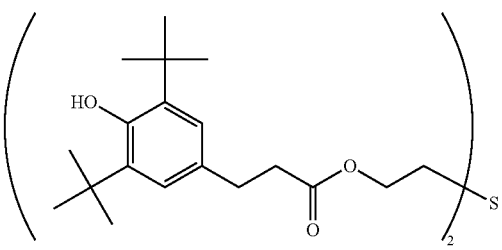

D-3
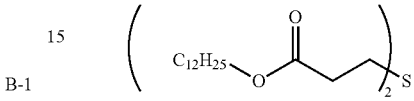

TABLE 1

| Blend (parts by mass) | | Ex. 1 | Ex. 2 | Ex. 3 | Ex. 4 | Ex. 5 | Ex. 6 |
|---|---|---|---|---|---|---|---|
| Solid silica fine particles | A-1 | 25.0 | 30.0 | | | | |
| | A-2 | | | 35.0 | | | 25.0 |
| | A-3 | | | | 15.0 | | |
| | A-4 | | | | | 15.0 | |
| (Meth)acrylate | B-1 | 45.0 | 45.0 | 35.0 | 35.0 | | |
| | B-2 | | | | | 35.0 | |
| | B-3 | | | | | | 45.0 |
| Epoxy (meth)acrylate | C-1 | 30.0 | | | 50.0 | 50.0 | 30.0 |
| | C-2 | | 25.0 | 30.0 | | | |
| Antioxidant | E-1 | 1.00 | 1.00 | 1.00 | 1.00 | 1.00 | 1.00 |
| | E-2 | 1.00 | 1.00 | 1.00 | 1.00 | 1.00 | 1.00 |
| | E-3 | 1.75 | 1.75 | 1.75 | 1.75 | 1.75 | 1.75 |
| Polymerization initiator | F-1 | 0.50 | | | 0.50 | | 0.25 |
| | F-2 | | 0.50 | 0.50 | | 0.50 | |

TABLE 2

| Blend (parts by mass) | | Ex. 7 | Ex. 8 | Ex. 9 | Ex. 10 | Ex. 11 | Ex. 12 |
|---|---|---|---|---|---|---|---|
| Solid silica fine particles | A-1 | 5 | 35 | 10 | 52 | 8 | 55 |
| | A-2 | | | | | | |
| | A-3 | | | | | | |
| | A-4 | | | | | | |
| (Meth)acrylate | B-1 | 54 | 5 | 20 | 29 | 30 | 20 |
| | B-2 | | | | | | |
| | B-3 | | | | | | |
| Epoxy (meth)acrylate | C-1 | 41 | 60 | | | 47 | 5 |
| | C-2 | | | 70 | 19 | | |
| Urethane (meth)acrylate | D-1 | | | | | 15 | 20 |
| Antioxidant | E-1 | 1.00 | 1.00 | 1.00 | 1.00 | 1.00 | 1.00 |
| | E-2 | 1.00 | 1.00 | 1.00 | 1.00 | 1.00 | 1.00 |
| | E-3 | 1.75 | 1.75 | 1.75 | 1.75 | 1.75 | 1.75 |
| Polymerization initiator | F-1 | 0.50 | | 0.50 | | 0.50 | |
| | F-2 | | 0.50 | | 0.50 | | 0.50 |

TABLE 3

|  | Ex. 1 | Ex. 2 | Ex. 3 | Ex. 4 | Ex. 5 | Ex. 6 |
|---|---|---|---|---|---|---|
| Amount of substance of ethylenically unsaturated groups in curable composition (mmol/g) | 3.03 | 2.56 | 2.15 | 3.12 | 3.09 | 2.77 |
| Refractive index $n_D$ of curable composition | 1.488 | 1.484 | 1.482 | 1.489 | 1.481 | 1.491 |
| Refractive index $n_D$ of cured product | 1.517 | 1.514 | 1.512 | 1.518 | 1.511 | 1.521 |
| Abbe number $v_D$ of curable composition | 57.4 | 58.2 | 58.0 | 57.3 | 58.5 | 57.8 |
| Abbe number $v_D$ of cured product | 58.0 | 59.0 | 58.3 | 57.8 | 59.1 | 57.2 |
| Crack resistance | A | A | A | A | A | A |
| Glass transition temperature (° C.) of cured product | At least 350° C. | At least 350° C. | At least 350° C. | At least 350° C. | 186° C. | At least 350° C. |
| 400 nm transmittance (%) per 1 mm in thickness of cured product before wet heat test | 89.6 | 88.3 | 89.6 | 89.1 | 88.2 | 89.6 |
| 400 nm transmittance (%) per 1 mm in thickness of cured product after wet heat test | 87.3 | 85.9 | 88.0 | 87.3 | 86.7 | 87.2 |
| 400 nm internal transmittance (%) per 1 mm in thickness of cured product before wet heat test | 98.2 | 96.7 | 98.0 | 97.6 | 96.5 | 98.3 |
| 400 nm internal transmittance (%) per 1 mm in thickness of cured product after wet heat test | 95.7 | 94.1 | 96.2 | 95.6 | 94.9 | 95.7 |
| 400 nm internal transmittance (%) per 0.1 mm in thickness of cured product before wet heat test | 99.8 | 99.7 | 99.8 | 99.8 | 99.6 | 99.8 |
| 400 nm internal transmittance (%) per 0.1 mm in thickness of cured product after wet heat test | 99.6 | 99.4 | 99.6 | 99.6 | 99.5 | 99.6 |
| Shortest wavelength (nm) where the transmittance of cured product before wet heat test becomes at least 85% | 372 | 369 | 363 | 378 | 369 | 378 |
| Shortest wavelength (nm) where the transmittance of cured product after wet heat test becomes at least 85% | 391 | 392 | 388 | 391 | 393 | 392 |

TABLE 4

|  | Ex. 7 | Ex. 8 | Ex. 9 | Ex. 10 | Ex. 11 | Ex. 12 |
|---|---|---|---|---|---|---|
| Amount of substance of ethylenically unsaturated groups in curable composition (mmol/g) | 3.78 | 1.94 | 2.02 | 1.69 | 2.39 | 1.35 |
| Refractive index $n_D$ of curable composition | 1.492 | 1.476 | 1.481 | 1.482 | 1.486 | 1.476 |
| Refractive index $n_D$ of cured product | 1.521 | 1.501 | 1.510 | 1.512 | 1.515 | 1.506 |
| Abbe number $v_D$ of curable composition | 55.8 | 58.9 | 57.0 | 58.5 | 58.2 | 58.9 |
| Abbe number $v_D$ of cured product | 56.1 | 58.7 | 57.4 | 58.8 | 57.8 | 58.0 |
| Crack resistance | A | A | A | A | A+ | A+ |
| Glass transition temperature (° C.) of cured product | 132° C. | 220° C. | 121° C. | At least 350° C. | 100° C. | At least 350° C. |
| 400 nm transmittance (%) per 1 mm in thickness of cured product before wet heat test | 90.7 | 89.1 | 90.6 | 88.1 | 91.2 | 88.2 |
| 400 nm transmittance (%) per 1 mm in thickness of cured product after wet heat test | 89.3 | 86.5 | 88.9 | 85.5 | 90.3 | 85.6 |
| 400 nm internal transmittance (%) per 1 mm in thickness of cured product before wet heat test | 99.4 | 97.5 | 99.1 | 96.5 | 99.7 | 96.7 |
| 400 nm internal transmittance (%) per 1 mm in thickness of cured product after wet heat test | 98.0 | 94.4 | 97.1 | 93.4 | 98.9 | 93.6 |
| 400 nm internal transmittance (%) per 0.1 mm in thickness of cured product before wet heat test | 99.9 | 99.8 | 99.9 | 99.7 | 99.9 | 99.7 |
| 400 nm internal transmittance (%) per 0.1 mm in thickness of cured product after wet heat test | 99.8 | 99.4 | 99.7 | 99.3 | 99.9 | 99.3 |
| Shortest wavelength (nm) where the transmittance of cured product before wet heat test becomes at least 85% | 359 | 372 | 360 | 382 | 355 | 387 |
| Shortest wavelength (nm) where the transmittance of cured product after wet heat test becomes at least 85% | 374 | 394 | 378 | 392 | 374 | 405 |

TABLE 5

| Blend (parts by mass) |  | Ex. 13 | Ex. 14 | Ex. 15 | Ex. 16 | Ex. 17 | Ex. 18 | Ex. 19 |
|---|---|---|---|---|---|---|---|---|
| Solid silica fine particles | A-2 |  |  |  | 35.0 | 30.0 | 30.0 | 30.0 |
|  | A'-1 | 35.0 |  |  |  |  |  |  |
|  | A'-2 |  | 15.0 |  |  |  |  |  |
|  | A'-3 |  |  | 30.0 |  |  |  |  |
| (Meth)acrylate | B-1 | 35.0 | 35.0 | 45.0 |  |  |  |  |
|  | B-2 |  |  |  |  |  | 30.0 | 30.0 |
|  | B'-1 |  |  |  | 35.0 |  |  |  |
|  | B'-2 |  |  |  |  | 30.0 |  |  |
| Epoxy (meth)acrylate | C-1 |  | 50.0 | 25.0 |  |  |  |  |
|  | C-2 | 30.0 |  |  | 30.0 | 40.0 |  |  |
|  | C'-1 |  |  |  |  |  | 40.0 |  |
|  | C'-2 |  |  |  |  |  |  | 40.0 |

TABLE 5-continued

| Blend (parts by mass) | | Ex. 13 | Ex. 14 | Ex. 15 | Ex. 16 | Ex. 17 | Ex. 18 | Ex. 19 |
|---|---|---|---|---|---|---|---|---|
| Antioxidant | E-1 | 1.00 | 1.00 | 1.00 | 1.00 | 1.00 | 1.00 | 1.00 |
| | E-2 | 1.00 | 1.00 | 1.00 | 1.00 | 1.00 | 1.00 | 1.00 |
| | E-3 | 1.75 | 1.75 | 1.75 | 1.75 | 1.75 | 1.75 | 1.75 |
| Polymerization initiator | F-1 | 0.50 | | 0.50 | | | | 0.50 |
| | F-2 | | 0.50 | | 0.50 | 0.50 | 0.50 | |

TABLE 6

| | Ex. 13 | Ex. 14 | Ex. 15 | Ex. 16 | Ex. 17 | Ex. 18 | Ex. 19 |
|---|---|---|---|---|---|---|---|
| Amount of substance of ethylenically unsaturated groups in curable composition (mmol/g) | 2.22 | 3.11 | 2.89 | 1.86 | 2.54 | 2.93 | 3.37 |
| Refractive index $n_D$ of curable composition | 1.482 | 1.489 | 1.487 | 1.481 | 1.470 | 1.480 | 1.482 |
| Refractive index $n_D$ of cured product | — | 1.518 | 1.517 | 1.511 | 1.500 | — | — |
| Abbe number $v_D$ of curable composition | 58.0 | 57.5 | 56.0 | 58.1 | 58.6 | 57.9 | 57.1 |
| Abbe number $v_D$ of cured product | — | 57.4 | 55.4 | 58.2 | 58.0 | — | — |
| Crack resistance | B | A | A | A | A | B | B |
| Glass transition temperature (° C.) of cured product | At least 350° C. | At least 350° C. | At least 350° C. | 52° C. | 68° C. | At least 350° C. | At least 350° C. |
| 400 nm transmittance (%) per 1 mm in thickness of cured product before wet heat test | — | 5.64 | 89.5 | 89.9 | 90.0 | — | — |
| 400 nm transmittance (%) per 1 mm in thickness of cured product after wet heat test | — | — | 80.1 | 65.6 | 80.2 | — | — |
| 400 nm internal transmittance (%) per 1 mm in thickness of cured product before wet heat test | — | 6.2 | 98.0 | 98.3 | 98.1 | — | — |
| 400 nm internal transmittance (%) per 1 mm in thickness of cured product after wet heat test | — | — | 87.7 | 71.7 | 87.6 | — | — |
| 400 nm internal transmittance (%) per 0.1 mm in thickness of cured product before wet heat test | — | 75.7 | 99.8 | 99.8 | 99.8 | — | — |
| 400 nm internal transmittance (%) per 0.1 mm in thickness of cured product after wet heat test | — | — | 98.7 | 96.7 | 98.7 | — | — |
| Shortest wavelength (nm) where the transmittance of cured product before wet heat test becomes at least 85% | — | 475 | 390 | 368 | 365 | — | — |
| Shortest wavelength (nm) where the transmittance of cured product after wet heat test becomes at least 85% | — | — | 430 | 650 | 475 | — | — |

In Ex. 1 to 12, the Abbe number is high, being excellent in transparency and crack resistance, and it is possible to suppress a decrease in transparency over a long period of time.

In particular, in Ex. 11 and 12 containing the urethane (meth)acrylate D, even after heat treatment for preparing the cured product for evaluation was conducted at 250° C. for 15 minutes, no formation of cracks was observed in the cured product. Further, even after the wet heat test, no formation of cracks was observed in the cured product. This is considered to be such that by the urethane (meth)acrylate D, flexibility of the cured product was improved, and cracks due to heat shrinkage was inhibited, whereby the crack resistance became further excellent.

In Ex. 13, since the organic component of solid silica fine particles exceeded 5 mass %, transparency of the cured product was inferior. Therefore, measurement of the refractive index and transmittance of the cured product was not carried out. In Ex. 14, since the median diameter of the solid silica fine particles exceeded 20 nm, transparency of the cured product was inferior.

In Ex. 15, since the organic component in the solid silica fine particles exceeded 5 mass %, it was inferior in transparency after the wet heat test. In Ex. 16 and 17, since the glass transition temperature of the homopolymer of the (meth)acrylate was less than 90° C., the glass transition temperature of the cured product was low, and the cured product was likely to be softened under high temperature and high humidity. Further, as it is softened, it absorbs water more, whereby oxidation proceeds further, whereby it was inferior in transparency after the wet heat test.

In each of Ex. 18 and 19, since the amount of substance of ethylenically unsaturated groups in the epoxy(meth)acrylate exceeded 3.0 mmol/g, cracks were formed in the cured product.

In Ex. 18, cracks were formed in the cured product. Since cracks were formed in the cured product, the measurement of the refractive index and transmittance of the cured product was not performed, and in Ex. 19, cracks were formed in the cured product after the wet heat test.

INDUSTRIAL APPLICABILITY

The curable composition and the cured product of the present invention are useful as materials which are used, for example, for the production of optical members (lens, prisms, anti-reflection films, optical waveguides, LED sealing materials, etc.), recording media, semiconductor devices, etc.

This application is a continuation of PCT Application No. PCT/JP2018/032145, filed on Aug. 30, 2018, which is based upon and claims the benefit of priority from Japanese Patent Application No. 2017-195229 filed on Oct. 5, 2017. The contents of those applications are incorporated herein by reference in their entireties.

What is claimed is:

1. A curable composition comprising
solid silica fine particles A, of which an organic component is at most 5 mass % and the median diameter is from 5 to 20 nm,
(meth)acrylate B which has an alicyclic condensed ring, and of which the glass transition temperature of the homopolymer is from 90 to 350° C.,
epoxy (meth)acrylate C which has no aromatic ring, and in which the amount of substance of ethylenically unsaturated groups is from 0.1 to 3.0 mmol/g (but excluding the (meth)acrylate B), urethane (meth)acrylate D having no aromatic ring (but excluding the (meth)acrylate B and the epoxy (meth)acrylate C), an antioxidant, and a polymerization initiator, wherein said antioxidant comprises an antioxidant having a phenol moiety and an antioxidant having a sulfide moiety (but excluding the antioxidant having a phenol moiety), in the total of the solid silica fine particles A, the (meth)acrylate B, the epoxy (meth)acrylate C and the urethane (meth)acrylate D, the solid silica fine particles A are from 3 to 55 mass %, the (meth)acrylate B is from 3 to 70 mass %, the epoxy (meth)acrylate C is from 10 to 80 mass %, and the urethane (meth)acrylate D is from 0 to 60 mass %, and to 100 parts by mass in total of the solid silica fine particles A, the (meth)acrylate B, the epoxy (meth)acrylate C and the urethane (meth)acrylate D, the antioxidant is from 0.1 to 10 parts by mass, and the polymerization initiator is from 0.1 to 10 parts by mass.

2. The curable composition according to claim 1, wherein the urethane (meth)acrylate D is 0 mass %, in the total of the solid silica fine particles A, the (meth)acrylate B and the epoxy (meth)acrylate C, the solid silica fine particles A are from 15 to 50 mass %, the (meth)acrylate B is from 25 to 65 mass %, and the epoxy (meth)acrylate C is from 20 to 50 mass %, and to 100 parts by mass in total of the solid silica fine particles A, the (meth)acrylate B and the epoxy (meth)acrylate C, the antioxidant is from 0.1 to 10 parts by mass, and the polymerization initiator is from 0.1 to 10 parts by mass.

3. The curable composition according to claim 1, wherein the alicyclic condensed ring in the (meth)acrylate B is a ring derived from at least one group selected from the group consisting of a norbornyl group, an isobornyl group, a tricyclodecanyl group, a dicyclopentanyl group, a tetracyclododecanyl group, a noradamantyl group, an adamantyl group and an amantyl group.

4. The curable composition according to claim 1, wherein the number of ethylenically unsaturated groups, which the (meth)acrylate B has, is one or two.

5. The curable composition according to claim 1, wherein the amount of substance of ethylenically unsaturated groups in the urethane (meth)acrylate D is from 0.1 to 3.0 mmol/g.

6. The curable composition according to claim 1, which contains a solvent which is capable of dissolving the (meth)acrylate B, the epoxy (meth)acrylate C, the urethane (meth)acrylate D, the antioxidant and the polymerization initiator.

7. A cured product formed by curing the curable composition as defined in claim 1.

8. A cured product, comprising, in cured form, the curable composition of claim 1, wherein the solid silica fine particles are dispersed in the matrix resin, wherein the internal transmittance of light having a wavelength of 400 nm per 1 mm in thickness of the cured product, is at least 90%, and the internal transmittance of light having a wavelength of 400 nm per 1 mm in thickness of the cured product after being held in an atmosphere at a temperature of 85° C. under a relative humidity of 85% for 1,000 hours, is at least 90%.

9. The cured product according to claim 8, wherein to the internal transmittance of light having a wavelength of 400 urn per 1 mm in thickness of the cured product before being held in an atmosphere at a temperature of 85° C. under a relative humidity of 85% for 1,000 hours, the retention rate of the internal transmittance of light having a wavelength of 400 nm per 1 mm in thickness of the cured product after being held in an atmosphere at a temperature of 85° C. under a relative humidity of 85% for 1,000 hours, is at least 90%.

10. The cured product according to claim 8, wherein the shortest wavelength in the wavelength region where the transmittance of the cured product becomes at least 85% after being held in an atmosphere at a temperature of 85° C. under a relative humidity of 85% for 1,000 hours, is at most 420 nm.

11. The cured product according to claim 8, wherein the alicyclic condensed ring is a ring derived from at least one group selected from the group consisting of a norbornyl group, an isobornyl group, a tricyclodecanyl group, a dicyclopentanyl group, a tetracyclododecanyl group, a noradamantyl group, an adamantyl group and an amantyl group.

12. The cured product according to claim 8, wherein in the total of the matrix resin and the solid silica fine particles, the solid silica fine particles are from 15 to 50 mass %, and the matrix resin is from 50 to 85 mass %.

13. The cured product according to claim 8, wherein the glass transition temperature of the cured product is from 90 to 350° C.

14. The cured product according to claim 8, wherein the refractive index to light having a wavelength of 589 nm of the cured product is at least 1.45.

15. The cured product according to claim 8, wherein the Abbe number of the cured product obtained by the following formula I is at least 54, $$v_D=(n_D-1)/(n_F-n_C)$$ Formula I wherein $v_D$ is the Abbe number, $n_D$ is the refractive index to light having a wavelength of 589 nm, $n_F$ is the refractive index to light having a wavelength of 486 nm, and $n_C$ is the refractive index to light having a wavelength of 656 nm.

16. The curable composition according to claim 1, wherein the number of ethylenically unsaturated groups, which the (meth)acrylate B has, is one.

17. The curable composition according to claim 1, wherein the number of ethylenically unsaturated groups, which the (meth)acrylate B has, is two.

18. The curable composition according to claim 1, wherein the alicyclic condensed ring in the (meth)acrylate B is a ring derived from a norbornyl group.

19. The curable composition according to claim 1, wherein the alicyclic condensed ring in the (meth)acrylate B is a ring derived from an isobornyl group.

20. The curable composition according to claim 1, wherein the alicyclic condensed ring in the (meth)acrylate B is a ring derived from a tricyclodecanyl group.

* * * * *